Nov. 7, 1933.                    H. J. FERRIS                    1,934,177
                              MILKING PARLOR STALL
                              Filed Jan. 16, 1933                2 Sheets-Sheet 1
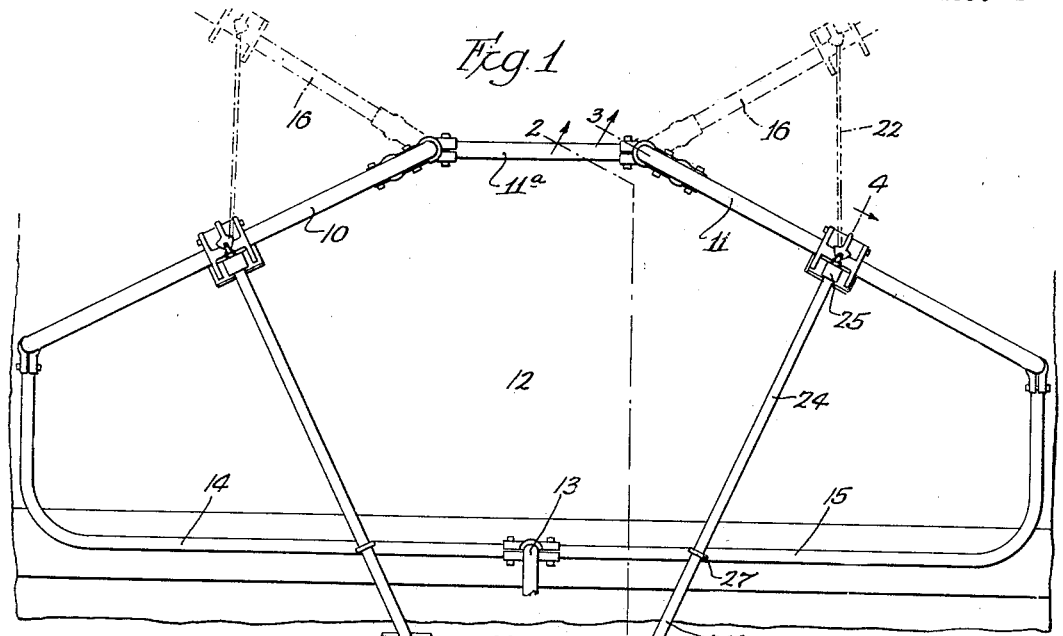
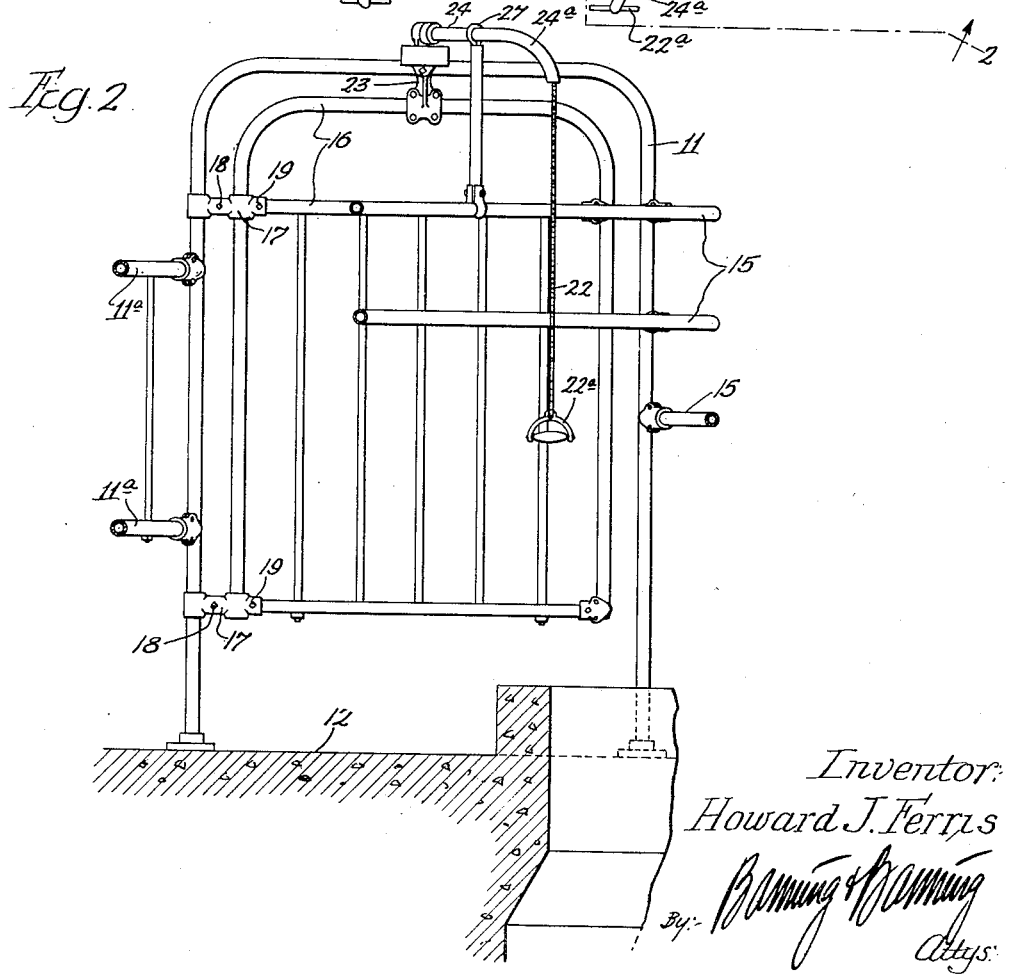
Inventor:
Howard J. Ferris Nov. 7, 1933.   H. J. FERRIS   1,934,177
MILKING PARLOR STALL
Filed Jan. 16, 1933   2 Sheets-Sheet 2
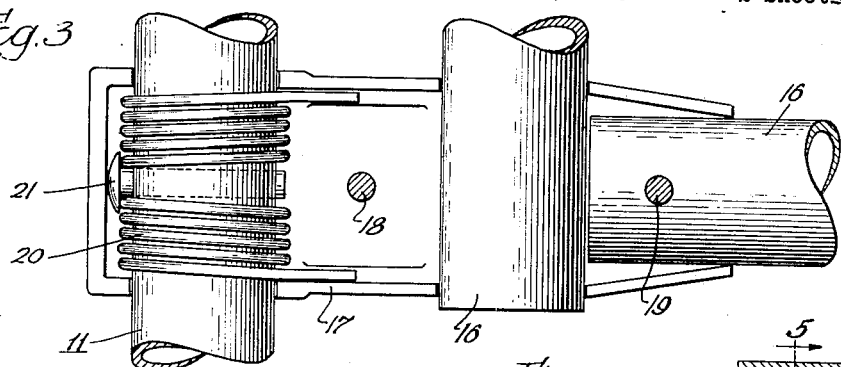
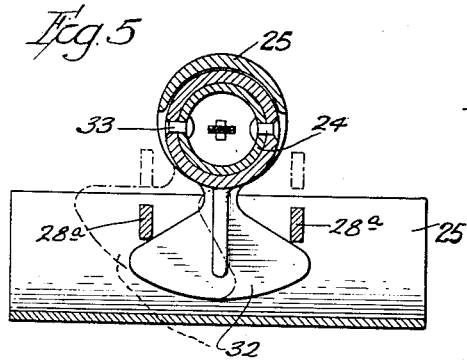
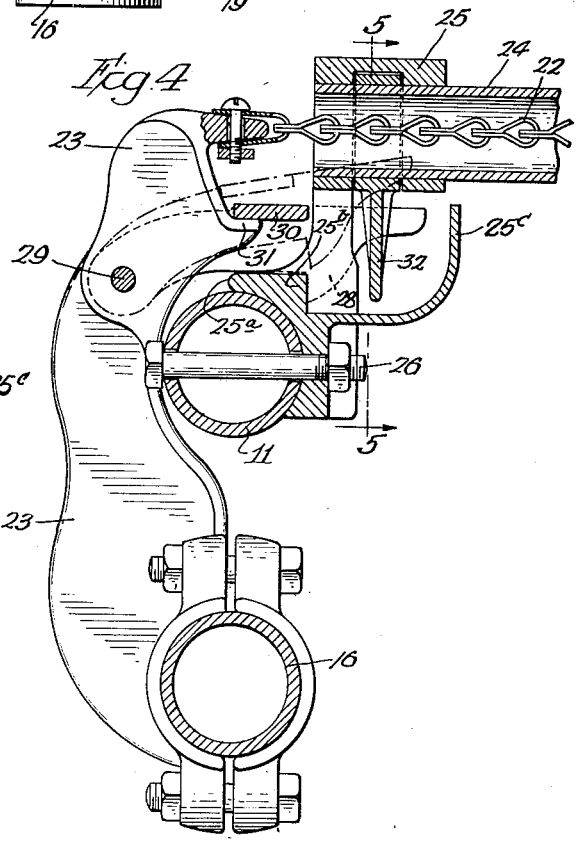
Inventor,
Howard J. Ferris Patented Nov. 7, 1933

1,934,177

UNITED STATES PATENT OFFICE 1,934,177

MILKING PARLOR STALL

Howard J. Ferris, Harvard, Ill., assignor to Starline Inc., Harvard, Ill., a corporation of Illinois Application January 16, 1933. Serial No. 651,967

7 Claims. (Cl. 119—27)

This invention relates to cow stalls, and more particularly to milking parlor stalls of a type having two gates wherein the cow to be milked is admitted through one gate, while the other remains closed, and after being milked the cow passes out through the other gate.

The milking operation is performed by milking machines which are tended by operators who walk up and down in an aisle at the side of the milking stalls, the aisle being below the level of the floor of the milking stalls, and on the side of the stalls away from the gates so that some means is needed for enabling the operator to readily open and close the gates from the aisle.

An object of this invention is to provide a simple and efficient means for opening and closing the gates of such stalls from the aisle.

Another object is to provide such an operating means in which a single element serves to control the opening and closing of the gate.

In the drawings:

Figure 1 is a top plan view of a stall embodying the invention;

Fig. 2 is an elevation on the broken line 2—2 of Fig. 1 showing one of the gates and the operating means therefor;

Fig. 3 is an enlarged section through one of the gate hinges taken on the line 3 of Fig. 1;

Fig. 4 is an enlarged section on the line 4 of Fig. 1 showing the mechanism for locking the gate; and Fig. 5 is a partial section on the line 5 of Fig. 4.

The embodiment illustrated comprises a stall having arches 10 and 11 connected by horizontal bars 11a, the arches being adapted to be set on a floor 12, preferably of concrete, while opposite these is a post 13 secured to the same floor, the post being connected to the arches by means of horizontal bars 14, 15, the latter being broken away at different points in Fig. 2 to show the parts behind them. All of these parts are preferably tubular, and while shown as round they may be of any other suitable cross section. The post 13, broken away, may carry the milking apparatus which is not shown, as it forms no part of the present invention.

Within each one of the arches is located a gate or door 16 which is hingedly mounted on its arch by means of two castings 17 (Fig. 3) secured to the gate by means of bolts 18, 19. These castings are hollow and each adapted to pass about half way around the vertical pipe 11 of the arch, as shown in Fig. 3, and to enclose a reversely coiled spring 20, the center of which is secured to a pin 21, while the ends bear upon the inside of the casting to urge the gate toward the open or dotted line position of Fig. 1.

I have provided means for closing the gate which is operable from the runway in front of the stall, and consists of a chain 22, or other flexible means, which is secured to a bracket 23 (Fig. 4) which is bolted to the top of the gate 16. This chain passes through a tube 24 which is journaled in a bearing 25 which is secured to the top of the arch 11 by means of a bolt 26. The tube 24 extends across one end of the stall and passes through a guide ring 27 or the like on the top bar 15. The outer end of the tube 24 is curved downwardly at 24a so as to act as a guide for the chain 22, which has a handle 22a at the bottom of the depending portion, as shown in Fig. 2. By pulling downwardly on this chain the gate 16 is drawn shut. The mechanism for locking it in this closed position will now be described.

The bracket 23 carries a bifurcated latch 28 which is pivotally mounted thereon by means of a bolt 29, and which has a portion 30 adapted to rest upon an extension 31 on the bracket so as to hold the latch in horizontal position while the gate is open. As the gate is brought toward closed position the sloping front part of the latch engages the corner 25a of the bearing 25, thereby forcing the latch up to the dotted line position of Fig. 4 and over the shoulder 25b, the bearing having a guard 25c. As soon as it has passed this shoulder the latch drops, as shown in full lines in Fig. 4, thereby locking the gate in closed position. This latch has two forwardly extending ears 28a (Fig. 5) which lie one on each side of and below the tube 24. The tube carries an operating member 32 which is secured thereto by means of rivets 33. This operating member is shown in its middle position, and has an edge substantially engaging each of the ears 28a.

Thus it will be seen that any movement of the tube 24 tending to rock it in either direction from its midposition will lift the ears 28a. When this movement has progressed to the point that the latch 28 (Fig. 4) is lifted above the shoulder 25b, the springs 20 will force the gate open. Thus by taking hold of the depending portion of the chain 22 and pulling it to one side and then while still holding it at one side slightly releasing it, the operator can release the latch and permit the gate to swing open under the action of the springs 20. To return the gate to closed position he grasps the depending portion of the chain 22 and pulls straight down on it, thereby drawing the gate back to the closed position when the latch will operate to retain it as has been described.

Thus it will be seen that the operator has complete control of the gates, and can open or close either of them at will merely by manipulating the chain 22 while he stands in the depressed runway at the side of the milking stall. To permit a cow to enter he will open the rear gate while keeping the front one closed, and as soon as she has entered the stall will close the rear gate. She will then be milked in the usual way, after which he will open the forward gate and permit her to pass out of the milking stall. This gate will then be closed and the rear gate opened for the next cow.

I claim:

1. In a cow stall, a frame including an arch, a gate hingedly mounted in the arch, means urging the gate to open position, means carried by the arch and gate for locking the gate in closed position, means for releasing the locking means including a rigid, rotatable member extending across the stall, said rigid member being hollow, and a flexible member movable through the rigid member and secured at one end to the gate to draw the gate back to closed position.

2. In a cow stall, a frame including an arch, a gate hingedly mounted in the arch, means urging the gate to open position, means carried by the arch and gate for locking the gate in closed position, means for releasing the locking means including a rigid, rotatable member extending across the stall, said rigid member being hollow, and a flexible member supported by the rigid member and secured at one end to the gate to draw the gate back to closed position.

3. In a cow stall, a frame including an arch, a gate hingedly mounted in the arch, means urging the gate to open position, means carried by the arch and gate for locking the gate in closed position, means for releasing the locking means including a rigid, rotatable member extending across the stall, said rigid member being hollow, and a flexible member movable through the rigid member and secured at one end to the gate to draw the gate back to closed position, said rigid member being located above the stall so as to be operable from a remote position.

4. In a cow stall, a frame including an arch, a gate hingedly mounted in the arch, means urging the gate to open position, means carried by the arch and gate for locking the gate in closed position, means for releasing the locking means including a rigid, rotatable member extending across the stall, said rigid member being hollow, and a flexible member movable through the rigid member and secured at one end to the gate to draw the gate back to closed position, said rigid member having a curved outer end through which the flexible member passes whereby a lateral pull on the flexible member will cause the rigid member to rotate thereby releasing the locking means.

5. In an animal stall, a frame having an opening, a gate hingedly mounted on the frame and adapted to close said opening, a latch member carried by the gate and adapted to engage a shoulder on the frame to lock the gate in closed position, spring means tending to force the gate to open position, a tubular member mounted on the frame and operably connected to said latch to open the latch on movement of the tubular member, and a flexible member connected at one end to the gate and movable through the tubular member to return the gate to closed position.

6. In an animal stall, a frame having an opening, a gate hingedly mounted on the frame and adapted to close said opening, a latch member carried by the gate and adapted to engage a shoulder on the frame to lock the gate in closed position, spring means tending to force the gate to open position, a tubular member rotatably mounted on the frame and operably connected to said latch to open the latch on rotation of the tubular member, and a flexible member connected at one end to the gate and movable through the tubular member to return the gate to closed position.

7. In an animal stall, a frame having an opening, a gate hingedly mounted on the frame and adapted to close said opening, a latch member carried by the gate and adapted to engage a shoulder on the frame to lock the gate in closed position, spring means tending to force the gate to open position, a tubular member rotatably mounted on the frame and operably connected to said latch to open the latch on rotation of the tubular member, and a flexible member connected at one end to the gate and movable through the tubular member to return the gate to closed position, the tubular member having a curved end which is normally turned down and from which the free end of the flexible member depends whereby a sidewise pull on the free end will release the latch and a downward pull will return the gate to closed and locked position.

HOWARD J. FERRIS.